United States Patent
Doong et al.

(10) Patent No.: US 9,518,239 B2
(45) Date of Patent: Dec. 13, 2016

(54) PROCESS FOR REMOVING SULFUR COMPOUNDS FROM NATURAL GAS STREAMS

(71) Applicant: UOP LLC, Des Plaines, IL (US)

(72) Inventors: Shain-Jer Doong, Kildeer, IL (US); Jayant Kumar Gorawara, Buffalo Grove, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 332 days.

(21) Appl. No.: 14/445,502

(22) Filed: Jul. 29, 2014

(65) Prior Publication Data

US 2016/0032206 A1 Feb. 4, 2016

(51) Int. Cl.
*B01D 53/02* (2006.01)
*C10L 3/10* (2006.01)
(Continued)

(52) U.S. Cl.
CPC ............... *C10L 3/103* (2013.01); *B01D 53/04* (2013.01); *B01D 53/1437* (2013.01); *B01D 53/1462* (2013.01); *C10L 3/104* (2013.01); *B01D 2253/1124* (2013.01); *B01D 2256/24* (2013.01); *B01D 2257/104* (2013.01); *B01D 2257/30* (2013.01); *B01D 2259/402* (2013.01); (Continued)

(58) Field of Classification Search
CPC .................. B01D 2253/1124; B01D 2256/24; B01D 2257/104; B01D 2257/30; B01D 2259/40083; B01D 2259/402; B01D 53/04; B01D 53/1437; B01D 53/1462; C10L 2290/08; C10L 2290/10; C10L 2290/12; C10L 2290/542; C10L 3/103; C10L 3/104; Y02C 10/06; Y02C 10/08

See application file for complete search history.

(56) References Cited

U.S. PATENT DOCUMENTS 3,225,516 A * 12/1965 Smith .................... B01D 53/04
                                                            95/122
3,767,766 A * 10/1973 Kilgren ................ B01D 53/526
                                                            423/220
(Continued)

OTHER PUBLICATIONS

Eckersley et al., "Mercury Treatment Options in Natural Gas Plants," 92nd Annual Gas Processors Association Convention—UOP Honeywell, Apr. 2013.

*Primary Examiner* — Christopher P Jones

(57) ABSTRACT

A process for the removal of sulfur compounds from a feed stream. A first separation zone removes sulfur compounds and produces a partially cleaned stream. A first adsorption zone adsorbs the remaining organic sulfur compounds on a regenerable adsorbent a produces a treated gas stream. A portion of the treated gas stream may regenerate the adsorbent in the first adsorption zone by removing organic sulfur compounds. The organic sulfur compound rich stream can be passed to a non-regenerable adsorption zone. The non-regenerable adsorption zone will separate out the organic sulfur compounds and provide a re-treated gas stream which may be recycled to a portion of the process. The non-regenerable adsorption zone may include regenerable adsorbent, but the zone is not operated to regenerate the adsorbent while it is in the non-regenerable adsorption zone.

20 Claims, 1 Drawing Sheet

(51) Int. Cl.
  *B01D 53/04* (2006.01)
  *B01D 53/14* (2006.01)

(52) U.S. Cl.
  CPC  *B01D 2259/40083* (2013.01); *C10L 2290/08* (2013.01); *C10L 2290/10* (2013.01); *C10L 2290/12* (2013.01); *C10L 2290/542* (2013.01); *Y02C 10/06* (2013.01); *Y02C 10/08* (2013.01)

(56) References Cited

U.S. PATENT DOCUMENTS

| | | | |
|---|---|---|---|
| 4,865,826 A | | 9/1989 | Carnell et al. |
| 5,089,034 A | * | 2/1992 | Markovs ............... B01D 53/04 95/123 |
| 5,203,888 A | * | 4/1993 | Maurer ............... B01D 53/047 95/101 |
| 7,906,088 B2 | | 3/2011 | Kanazirev et al. |
| 8,282,707 B2 | | 10/2012 | Bresler et al. |
| 2008/0041227 A1 | | 2/2008 | Mulvaney, III et al. |
| 2008/0107581 A1 | * | 5/2008 | Sparling ............ B01D 53/1462 423/222 |
| 2008/0282885 A1 | * | 11/2008 | Deckman ............... B01D 53/02 95/98 |
| 2009/0130009 A1 | * | 5/2009 | Kikkawa ................ B01D 53/75 423/228 |
| 2011/0290111 A1 | * | 12/2011 | Dunne ............... B01D 53/1443 95/51 |
| 2012/0000359 A1 | * | 1/2012 | Bresler .................. B01D 53/75 95/51 |
| 2013/0315794 A1 | | 11/2013 | Schaffer et al. |
| 2014/0033919 A1 | * | 2/2014 | Deckman ............ B01D 53/0473 95/100 |
| 2014/0208797 A1 | * | 7/2014 | Kelley ............... B01D 53/0473 62/611 |
| 2015/0290575 A1 | * | 10/2015 | Rothermel ............... C10L 3/101 95/148 |
| 2015/0376526 A1 | * | 12/2015 | Acikgoz ................. C10L 3/104 585/860 |

\* cited by examiner

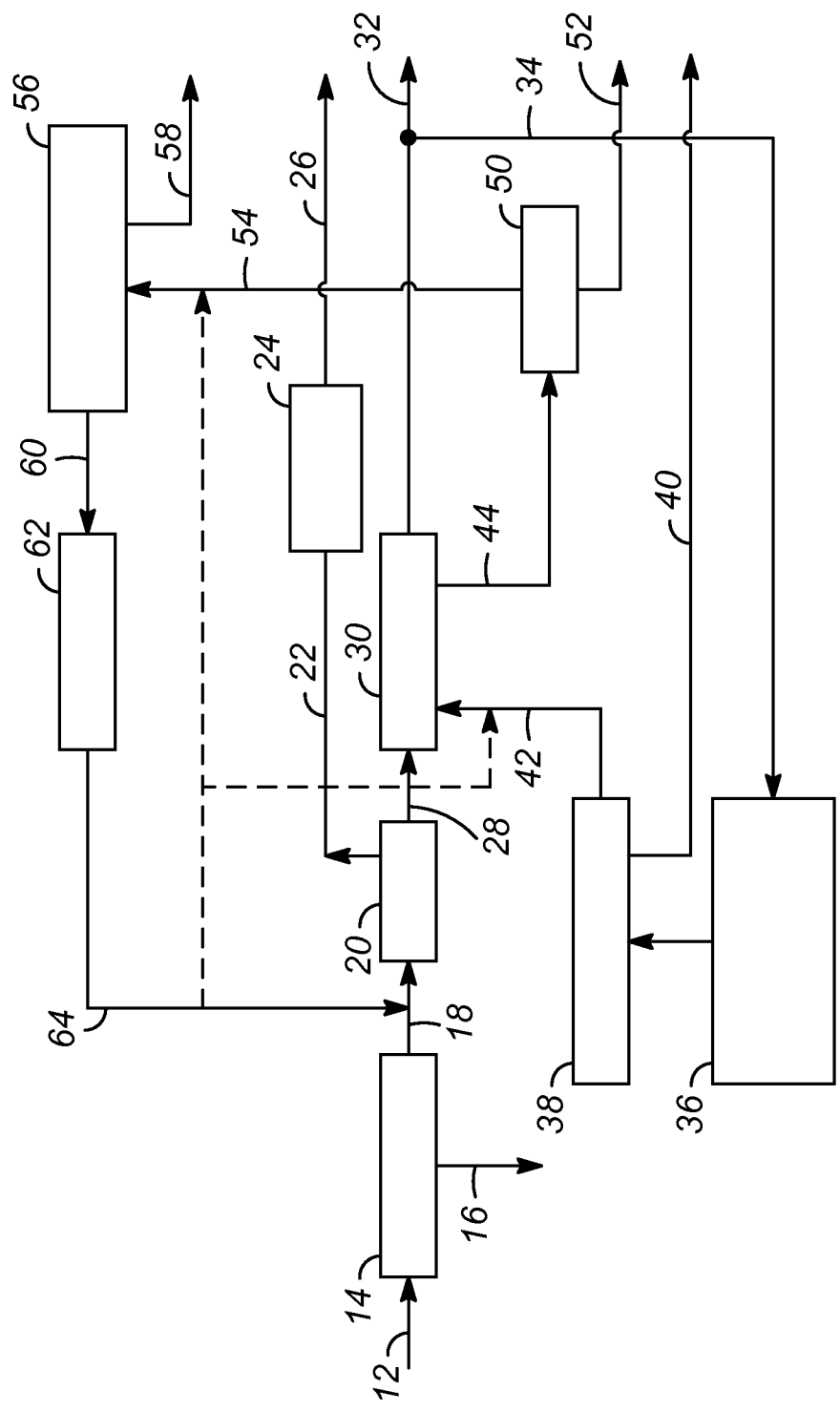

PROCESS FOR REMOVING SULFUR COMPOUNDS FROM NATURAL GAS STREAMS

FIELD OF THE INVENTION

This invention relates generally to a process for the treatment of natural gas streams to remove impurities, such as sulfur, from same.

BACKGROUND OF THE INVENTION

Natural gas processing can range from simple treating and conditioning for pipeline delivery to complex operations needed to meet specifications to produce pipeline sales gas or liquefied natural gas (LNG). Removal of acid gas compounds such as carbon dioxide and hydrogen sulfide, as well as removal of organic sulfur compounds, water, and mercury is required to meet end-product specifications and to avoid product blockages in downstream process equipment. The level of treatment that is required varies according to the end-product specifications, as well as local environmental regulations.

In some prior art treatment facilities, mercury is removed by a non-regenerable guard bed. Carbon dioxide and hydrogen sulfide are removed by a solvent process employing a solvent such as an amine. Water may be removed by a molecular sieve dehydration unit. One of the more difficult challenges is to remove carbonyl sulfide (COS) and organic sulfur compounds such as mercaptans, disulfides, and polysulfides.

There are two types of flow schemes that are typically employed to remove these organic sulfur compounds to meet the end-product specifications. One flow scheme is a gas phase treatment, in which a molecular sieve unit is designed to remove the organic sulfur compounds into a regeneration gas stream. The regeneration gas may then be treated by a physical solvent to produce pipeline sales gas or fuel gas and an acid gas stream containing the organic sulfur compounds. This acid gas stream, along with the acid gas generated in the amine unit, is then sent to a sulfur plant, such as one operating a Claus process, for sulfur recovery.

The other flow scheme that has been used to remove organic sulfur compounds is a liquid phase treatment, in which all or most of the carbonyl sulfide, organic sulfur compounds, or both are allowed to pass through a dehydration unit. In a natural gas liquid (NGL) unit, sulfur compounds are expected to be concentrated in the NGL stream. The NGL liquids or an after fractionation stream are then treated specifically for COS removal by a specialty-amine. Mercaptans are removed by a regenerable caustic process in which the mercaptans are converted to liquid hydrocarbon disulfides through use of caustics, such as sodium hydroxide or ammonia. Finally, the liquid is sulfur-polished to a low sulfur concentration by a molecular sieve unit to remove the remaining sulfur content.

The gas phase treatment requires a sulfur plant which is quite costly and therefore, only economically viable when the sulfur level of the natural gas is high. On the other hand, the liquid phase treatment requires an NGL unit, which is only economically viable when the gas is rich in $C_2$, $C_3$ and $C_4$ components. The liquid phase treatment also includes a caustic-based process, which requires disposal of the spent caustic.

If a gas processor receives a feed gas from different supply sources, the feed gas sulfur level, its hydrocarbon contents, or both may vary from time to time, which would mean that neither a sulfur plant nor an NGL unit would be economically viable. Due to the shortcomings of the existing systems, an alternative sulfur capture technology would be desirable.

Therefore, there remains a need for an effective and efficient process for removing sulfur from a natural gas feed stream.

SUMMARY OF THE INVENTION

A new process for removing sulfur from a natural gas feed stream has been developed in which a non-regenerable adsorption unit is disposed downstream of a regenerable adsorption unit in a gas-phase treatment process.

A first aspect of the invention may be characterized as a process for the treatment of a natural gas feed stream which includes: passing a natural gas feed stream to a separation zone to separate carbon dioxide and hydrogen sulfide from the natural gas feed stream to provide an at least partially cleaned stream; passing the at least partially cleaned stream to a first adsorption zone to separate organic sulfur compounds and provide a treated gas stream, wherein the first adsorption zone comprises one or more beds with a regenerable adsorbent; regenerating the regenerable adsorbent of the first adsorption zone with a portion of the treated gas stream to provide an organic sulfur rich stream; and, passing the organic sulfur rich stream to a second adsorption zone to separate organic sulfur compounds and provide a re-treated gas stream.

In some embodiments of the present invention, the second adsorption zone comprises a non-regenerable adsorption zone. It is contemplated that the non-regenerable adsorption zone comprises one or more beds with a regenerable adsorbent and the non-regenerable adsorption zone is operated in a non-regenerable manner.

In some embodiments of the present invention, the re-treated gas stream is passed to the separation zone, to the first adsorption zone, or to both. It is contemplated that at least a portion of the re-treated gas stream regenerates the regenerable adsorbent of the first adsorption zone.

In at least one embodiment of the present invention, the process also includes dehydrating the organic sulfur rich stream in a dehydration zone prior to passing the organic sulfur rich stream to the second adsorption zone. It is contemplated that the re-treated gas stream is passed to the dehydration zone.

In one or more embodiments of the present invention, the portion of the treated gas stream used to regenerate is passed to a de-oxygenation zone to provide an oxygen lean stream. It is contemplated that the oxygen lean stream is passed to a dehydration zone before passing the oxygen lean stream to the first adsorption zone. It is further contemplated that the portion of the treated gas stream used to regenerate, the oxygen lean stream, or both are dried.

In various embodiments of the present invention, the second adsorption zone comprises a metal oxide adsorbent. It is further contemplated that the process also includes disposing of the metal oxide adsorbent.

A second aspect of the invention may be characterized as a process for the treatment of a natural gas feed stream which includes: passing a natural gas feed stream to a first separation zone to separate hydrogen sulfide from the natural gas feed stream to provide an at least partially cleaned stream; passing the at least partially cleaned stream to a first adsorption zone to separate organic sulfur compounds and provide a treated gas stream, wherein the first adsorption zone comprises one or more beds with a regenerable adsorbent; recovering organic sulfur compounds from the first adsorption zone with a portion of the treated gas stream in an organic sulfur rich stream; passing the organic sulfur rich stream to a second adsorption zone to separate organic sulfur compounds and provide a re-treated gas stream; and, recycling the re-treated gas stream to a processing zone.

In some embodiments of the present invention, the re-treated gas stream is recycled back to the first separation zone, the first adsorption zone, or both. It is contemplated that at least a portion of the re-treated gas stream regenerates the regenerable adsorbent of the first adsorption zone.

In various embodiments of the present invention, the pressure of the re-treated gas stream is increased before the re-treated gas stream is recycled to the first separation zone.

In at least one embodiment of the present invention, the process further includes dehydrating the organic sulfur rich stream in a dehydration zone prior to passing the organic sulfur rich stream to the second adsorption zone. It is contemplated that the re-treated gas is recycled back to the dehydration zone.

In some embodiments of the present invention, the process also includes drying the portion of the treated gas stream used to recover organic sulfur compounds from the first adsorption zone.

Again, in various embodiments of the present invention, the second adsorption zone comprises a metal oxide adsorbent. It is further contemplated that the process also includes disposing of the metal oxide adsorbent.

In at least one embodiment of the present invention, the second adsorption zone comprises one or more beds with a regenerable adsorbent and the second adsorption zone is operated in a non-regenerable manner.

Additional objects, embodiments, and details of the invention are set forth in the following detailed description of the invention.

DETAILED DESCRIPTION OF THE DRAWINGS

In the drawings FIG. 1 depicts a process flow diagram according to one or more embodiments of the present invention.

DETAILED DESCRIPTION OF THE INVENTION

As mentioned above, an effective and efficient process for removing sulfur from a natural gas feed stream has been developed. The process allows for a regenerable adsorption zone to be used to produce a treated gas stream, and allows for an efficient recovery of the treated gas from the portion used to regenerate the adsorbent by using a non-regenerable adsorption bed.

As shown in FIG. 1, in a preferred embodiment of the present invention, a natural gas feed 12 is sent to an adsorbent guard bed 14 with mercury removal shown being removed in a line 16. Within the adsorbent guard bed 14, carbonyl sulfide is hydrolyzed to form hydrogen sulfide which is more easily removed from the system. The gas feed then is sent through a line 18 to a separation zone 20, preferably an absorber unit which may use an amine solvent (or other appropriate solvent), to remove carbon dioxide and hydrogen sulfide to produce a carbon dioxide rich stream 22. The carbon dioxide rich stream 22 may be sent to another guard bed 24, to remove any trace amounts of hydrogen sulfide, and then on to disposal of the adsorbent shown in a line 26.

A partially cleaned gas stream 28 from the separation zone 20 is sent to a first adsorption zone 30 having one or more adsorbent beds for removal of water and other impurities, including any remaining organic solvent compounds. A treated gas, which is lean in sulfur, mercury and other impurities, is shown being removed from the first adsorption zone 30 in a line 32. The treated gas can be further treated or transported as appropriate, the exact details of which are known in the art and are not necessary for one of ordinary skill in the art to practice the present invention.

As shown in FIG. 1, a slipstream 34 removes a portion of the treated gas in line 32 which is to be used to regenerate the adsorbent in the first adsorption zone 30. This slipstream 34 may be passed to a de-oxygenation zone 36 and then passed to a dehydration zone 38 to remove water via a line 40. The gas is returned via a line 42 to first adsorption zone 30 to regenerate the adsorbent therein. The gas is preferably heated in either the de-oxygenation zone 36 or the dehydration zone 38 to avoid oxygen and sulfur reacting to deactivate the adsorbent in the first adsorption zone 30. This gas supplied through the line 42 removes water, other liquids such as liquid hydrocarbons, as well as any remaining organic sulfur compounds from the first adsorption zone 30. The organic sulfur rich stream 44 still contains some treated gas which would be desirable to recover.

Accordingly, in order to remove sulfur from at least a portion of the organic sulfur rich stream 44, the organic sulfur rich stream 44 may be passed to a cooler 50 to cool the gas and remove water in a line 52. The cooled gas may be sent through a line 54 to a dehydrator 56 to also remove water in a line 58. The remaining gas then is sent through a line 60 to a non-regenerable adsorption zone 62.

In the non-regenerable adsorption zone 62, all of the sulfur compounds that are desorbed by the adsorption beds in the first adsorption zone 30 will be adsorbed to provide a re-treated gas stream 64.

In a most preferred embodiment, the non-regenerable adsorption zone 62 comprises one or more beds with a regenerable adsorbent, however, the non-regenerable adsorption zone 62 is operated in a non-regenerable manner. In other words, there is no active regeneration of the adsorbent in the non-regenerable adsorption zone 62. Accordingly, the non-regenerable adsorption zone 62 and the first adsorption zone 30 may include the same or similar adsorbent, but the zone will be operated differently, making one a regenerable adsorption zone, and the other a non-regenerable adsorption zone. Alternatively, the non-regenerable adsorption zone 62 may include other non-regenerable adsorbents. Thus, the present invention is not limited to the examples or embodiments herein, as any adsorbent with capacity for sulfur compounds can be used in the non-regenerable adsorption zone. Some examples, in addition to zeolite molecular sieve, are metal oxide (Cu, Zn, Fe, Mg, Ca, Ni, etc.), activated carbon, metal organic sorbents, polymeric materials, etc. Finally, the non-regenerable adsorption zone 62 preferably has an operating temperature in the range of ambient to approximately 300° C.

The non-regenerable adsorption zone 62 will have to be replaced after a certain period of time (depending on sulfur levels of the organic sulfur rich stream 44). Therefore, it is contemplated that the spent sorbents can be removed and disposed of through known processes.

Returning to FIG. 1, the re-treated gas stream 64 can be passed to the separation zone 20, or to the first adsorption zone 30, or to the dehydrator 56. A blower (not shown) may be used to increase the pressure of the re-treated gas stream 64 to send it back to one or more various portions of the process. In at least one embodiment, the re-treated gas stream 64 (or a portion thereof) is passed to the first adsorption zone 30 and is used to regenerate regenerable adsorbent(s) therein. Accordingly, the re-treated gas stream 64 may be combined with line 42.

In order to maintain a continuous operation, it is contemplated that the non-regenerable adsorption zone 62 comprises at least two units, either being in a parallel configuration or in a lead-lag configuration. Either of these configurations, as well as others, would allow for a unit to be removed from the process, without disrupting the processing.

The following example demonstrates an embodiment of the current invention. A natural gas stream at a flow rate of approximately 19.6 MSm$^3$/d (692 MMSCFD) at 43 bar and 45° C. with a composition shown in the first column of TABLE 1, below, is to be purified by removal of its water, carbon dioxide and sulfur contents before sending into a liquefied natural gas train or facility. It is believed that a feed gas will typically have a much lower sulfur content, but about 5% of the time, the sulfur content will reach the level shown in TABLE 1.

TABLE 1

|  | Feed | Product | Regeneration |
| --- | --- | --- | --- |
| Nitrogen | 5.07E−03 | 5.10E−03 | 4.88E−03 |
| Carbon Dioxide | 6.86E−03 | 3.31E−05 | 5.97E−05 |
| Methane | 0.969491 | 0.97589 | 0.932578 |
| Ethane | 1.41E−02 | 1.42E−02 | 0.01361 |
| Propane | 2.47E−03 | 2.49E−03 | 2.38E−03 |
| Isobutane | 4.90E−04 | 4.93E−04 | 4.71E−04 |
| N-BUTANE | 5.70E−04 | 5.74E−04 | 5.48E−04 |
| N-PENTANE | 2.10E−04 | 2.11E−04 | 2.02E−04 |
| Isopentane | 1.50E−04 | 1.51E−04 | 1.44E−04 |
| N-HEXANE | 4.00E−04 | 4.02E−04 | 2.24E−03 |
| Benzene | 1.60E−05 | 1.61E−05 | 9.00E−05 |
| Water | 1.20E−04 | 0 | 4.22E−02 |
| Hydrogen Sulfide | 2.84E−06 | 2.65E−08 | 8.33E−08 |
| Carbonyl Sulfide | 2.97E−07 | 2.79E−08 | 8.77E−08 |
| Methyl Mercaptan | 1.31E−06 | 0 | 5.46E−05 |
| Ethyl Mercaptan | 3.58E−07 | 0 | 1.48E−05 |
| N-Propyl Mercaptan | 2.41E−07 | 0 | 9.85E−06 |
| Phenyl Mercaptan | 9.63E−07 | 0 | 3.93E−05 |
| Dimethyl Sulfide | 1.79E−07 | 1.77E−08 | 6.62E−06 |
| Carbon Disulfide | 1.18E−07 | 1.18E−07 | 1.13E−07 |
| Methyl Ethyl Sulfide | 6.72E−08 | 6.61E−09 | 2.48E−06 |
| Dimethyl Disulfide | 7.28E−08 | 7.16E−09 | 2.68E−06 |
| Ethyl Methyl Disulfide | 9.52E−08 | 0 | 3.89E−06 |
| Diethyl Disulfide | 4.48E−08 | 0 | 1.83E−06 |
| Benzothiophene | 9.46E−07 | 0 | 3.87E−05 |
| 2-Methyl Benzothiophene | 2.46E−07 | 0 | 1.01E−05 |

The gas stream was treated using a process flow scheme according to the principles of the present invention, such as the embodiment, as shown in FIG. 1. Accordingly, mercury was removed by a copper-based adsorbent. Carbonyl sulfide was also partially converted to hydrogen sulfide in the same guard bed. Carbonyl sulfide was further reduced by an amine unit down to about 2 ppm-vol. Carbon dioxide was reduced to below 50 ppm-vol and hydrogen sulfide reduced to 1 ppm-vol by the amine unit.

A 5-bed adsorbent unit packed with 5A and 13X molecular sieves was used to remove water and all remaining sulfur compounds from the gas stream to produce a treated gas stream. The treated product gas composition is shown in the second column of TABLE 1, above.

A gas was used to regenerate the adsorbent in the 5-bed adsorbent unit. The gas was recovered as a regeneration gas. The regeneration gas had the composition of the third column in TABLE 1. As shown in the TABLE, the regeneration gas included some organic sulfur containing species and compounds. Accordingly, the regeneration gas was first cooled by an air cooler to about 45° C. in order to remove water. The regeneration gas was dried by a 2-bed adsorbent unit packed with 4A molecular sieve.

In order to remove the remaining organic sulfur containing species and compounds, the gas was then passed to two additional adsorbent units, each one packed with the same 5A and 13X molecular sieves. Since the total sulfur concentrations have been enriched in the regeneration gas, the partial pressures of each sulfur species are increased and thus the adsorption capacity in these two non-regenerable adsorbent units is increased. The gas recovered from these non-regenerable adsorbent units contained almost no (i.e., essentially zero) organic sulfur compounds.

Based upon the above modeling and experimentation, it is believed that if the sulfur spikes or increases in the plant feed occurs only 5% of the time, the adsorbents in the second adsorbent units (the non-regenerative adsorbent units) will only need to be changed once a year. Thus, the non-regenerable adsorption unit is ideal for processing streams that have low sulfur content. Additionally, such a unit is beneficial to avoid against sulfur spikes while processing streams. Thus, the present invention provides for a process which does not require the NGL unit or the sulfur plant. Accordingly, sulfur can be efficiently and economically be removed from the feed stream.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for the treatment of a natural gas feed stream comprising:
    passing a natural gas feed stream to a separation zone to separate carbon dioxide and hydrogen sulfide from the natural gas feed stream to provide an at least partially cleaned stream;
    passing the at least partially cleaned stream to a first adsorption zone to separate organic sulfur compounds and provide a treated gas stream, wherein the first adsorption zone comprises one or more beds with a regenerable adsorbent;
    regenerating the regenerable adsorbent of the first adsorption zone with a portion of the treated gas stream to provide an organic sulfur rich stream; and,
    passing the organic sulfur rich stream to a second adsorption zone to separate organic sulfur compounds and provide a re-treated gas stream.

2. The process of claim 1, wherein the second adsorption zone comprises a non-regenerable adsorption zone.

3. The process of claim 2, wherein the non-regenerable adsorption zone comprises one or more beds with a regenerable adsorbent and the non-regenerable adsorption zone is operated in a non-regenerable manner.

4. The process of claim 1 further comprising:
passing the re-treated gas stream to the separation zone.

5. The process of claim 1 further comprising:
passing the re-treated gas stream to the first adsorption zone.

6. The process of claim 1 further comprising:
dehydrating the organic sulfur rich stream in a dehydration zone prior to passing the organic sulfur rich stream to the second adsorption zone.

7. The process of claim 1 further comprising:
passing the portion of the treated gas stream used to regenerate to a de-oxygenation zone to provide an oxygen lean stream.

8. The process of claim 7 further comprising:
passing the oxygen lean stream to a dehydration zone before passing the oxygen lean stream to the first adsorption zone.

9. The process of claim 1 further comprising:
regenerating the regenerable adsorbent of the first adsorption zone with at least a portion of the re-treated gas stream.

10. The process of claim 1, wherein the second adsorption zone comprises a metal oxide adsorbent.

11. The process of claim 10 further comprising:
disposing of the metal oxide adsorbent.

12. A process for the treatment of a natural gas feed stream comprising:
passing a natural gas feed stream to a first separation zone to separate hydrogen sulfide from the natural gas feed stream to provide an at least partially cleaned stream;
passing the at least partially cleaned stream to a first adsorption zone to separate organic sulfur compounds and provide a treated gas stream, wherein the first adsorption zone comprises one or more beds with a regenerable adsorbent;
recovering organic sulfur compounds from the first adsorption zone with a portion of the treated gas stream in an organic sulfur rich stream;
passing the organic sulfur rich stream to a second adsorption zone to separate organic sulfur compounds and provide a re-treated gas stream; and,
recycling the re-treated gas stream to a processing zone.

13. The process of claim 12, wherein the re-treated gas stream is recycled back to the first separation zone.

14. The process of claim 13 further comprising:
increasing a pressure of the re-treated gas stream before the re-treated gas stream is recycled to the first separation zone.

15. The process of claim 12, wherein the re-treated gas stream is recycled back to the first adsorption zone.

16. The process of claim 12 further comprising:
dehydrating the organic sulfur rich stream in a dehydration zone prior to passing the organic sulfur rich stream to the second adsorption zone.

17. The process of claim 12 further comprising:
regenerating the regenerable adsorbent of the first adsorption zone with at least a portion of the re-treated gas stream.

18. The process of claim 12, wherein the second adsorption zone comprises a metal oxide adsorbent.

19. The process of claim 18 further comprising:
disposing of the metal oxide adsorbent.

20. The process of claim 12, wherein the second adsorption zone comprises one or more beds with a regenerable adsorbent and the second adsorption zone is operated in a non-regenerable manner.

* * * * *